United States Patent [19]

Gekat

[11] Patent Number: 5,050,181
[45] Date of Patent: Sep. 17, 1991

[54] WAVEGUIDE LASER WITH MICROWAVE EXCITATION

[75] Inventor: Frank Gekat, Korb, Fed. Rep. of Germany

[73] Assignee: Deutsche Forschungsanstalt fuer luft- und Raumfahrt e.V., Fed. Rep. of Germany

[21] Appl. No.: 609,937

[22] Filed: Nov. 6, 1990

[30] Foreign Application Priority Data

Nov. 10, 1989 [DE] Fed. Rep. of Germany ....... 3937491

[51] Int. Cl.$^5$ ............................................... H01S 3/09
[52] U.S. Cl. ...................................... 372/69; 372/64; 372/92
[58] Field of Search ...................... 372/69, 70; 378/64, 378/92

[56] References Cited

U.S. PATENT DOCUMENTS

| | | | |
|---|---|---|---|
| 4,004,249 | 1/1977 | Kikuchi | 372/64 |
| 4,513,424 | 4/1985 | Waynant et al. | 372/57 |
| 4,930,138 | 5/1990 | Opower | 372/95 |
| 4,939,738 | 7/1990 | Opower | 372/95 |
| 4,955,035 | 9/1990 | Gekat | 372/69 |

OTHER PUBLICATIONS

K. G. Handy et al., "Laser Generation by Pulsed 2.45-GHz Microwave Excitation of $CO_2$", *Journal of Applied Physics*, 49(7), Jul., 1978, pp. 3753 to 3756.

*Primary Examiner*—Leon Scott, Jr.
*Attorney, Agent, or Firm*—Barry R. Lipsitz

[57] ABSTRACT

To provide more economical excitation of the laser gas in a waveguide laser comprising a resonator having a resonator axis, an optical waveguide extending with a waveguide longitudinal direction essentially in the direction of the resonator axis and a gas-discharge volume located between the optical waveguide surfaces and containing a laser gas, it is proposed that a microwave source be provided, that an overcoupling structure separate from the laser gas in the gas-discharge volume be arranged on a side of one of the optical waveguide surfaces opposite the gas-discharge volume, the overcoupling structure being connected via a waveguide to a microwave source, extending in an overcoupling direction parallel to the optical waveguide surface and bringing about in a strip region in the gas-discharge volume along the overcoupling direction a substantially constant coupling-in of the microwave power.

27 Claims, 6 Drawing Sheets

WAVEGUIDE LASER WITH MICROWAVE EXCITATION

The invention relates to a waveguide laser comprising a resonator having mirrors arranged in spaced, opposite relation to each other in the direction of a resonator axis and a beam path extending in both the direction of the resonator axis and a transverse direction perpendicular thereto, an optical waveguide extending with a waveguide longitudinal direction essentially in the direction of the resonator axis between the mirrors and having optical waveguide surfaces extending in facing, parallel relation to each other in a plane parallel to the direction of the resonator axis and to the transverse direction and guiding the beam path by reflections, and a gas-discharge volume located between the optical waveguide surfaces and containing a laser gas.

Such a waveguide laser is known, for example, from European patent application No. 0 305 893. With such a waveguide laser, the excitation of the laser gas is brought about by a high-frequency discharge, with both waveguide surfaces serving as electrodes to which the high frequency is applied and via which the high-frequency excitation of the laser gas is brought about in the gas-discharge volume.

Such excitation of the gas-discharge involves the usual high-frequency-related technical problems of radiation and screening and is very expensive and complicated, especially when high-frequency powers which are high have to be coupled in.

The object underlying the invention is, therefore, to provide a waveguide laser of the generic kind with more economical excitation of the laser gas.

This object is accomplished in accordance with the invention with a waveguide laser of the kind described at the beginning by a microwave source being provided, by microwaves being introducible into a waveguide leading to the optical waveguide from a microwave source, by an overcoupling structure separate from the laser gas in the gas-discharge volume being arranged on a side of one of the optical waveguide surfaces opposite the gas-discharge volume, the overcoupling structure being connected to the waveguide, extending in an overcoupling direction parallel to the optical waveguide surface and bringing about in a strip region in the gas-discharge volume along the overcoupling direction a substantially constant coupling-in of the microwave power.

With such an inventive system, microwave excitation is made possible in a waveguide laser by simple means and, in particular, the inventive overcoupling structure ensures uniform distribution of the microwave power over the entire gas-discharge volume.

It is particularly advantageous within the scope of the inventive solution for the overcoupling structure to extend over a multiple of half a wavelength of the microwaves in the overcoupling direction and to thereby offer the possibility of achieving constant coupling-in of the microwave power over regions extending as far as possible in the lengthwise direction.

Various solutions known to the specialist in microwaves are conceivable for the design of the overcoupling structure. A solution is particularly preferred wherein the overcoupling structure comprises a waveguide section extending in the overcoupling direction with a wall which is broken open towards the optical waveguide surface.

Such an overcoupling structure is particularly easy to adapt to a waveguide introducing the microwaves and also offers the possibility of defining in a simple way by the type of the openings in the wall the coupling of the microwave power into the gas-discharge volume and of thereby achieving substantially constant coupling-in of the microwave power in the overcoupling direction.

In principle, the type of openings in the wall is optionally selectable. It has proven particularly advantageous for the broken-open wall to have a slot which extends in the overcoupling direction and through which overcoupling into the gas-discharge volume is possible.

In this connection, it is particularly expedient for the slot to have a width which increases in the microwave propagation direction. The coupling-in of the microwave power can be controlled in a particularly expedient way by the increasing width. In the presence of microwave power which is still high, the slot is narrow. Owing to the decrease in microwave power as a result of the increase in overcoupling in the microwave propagation direction, the slot can be chosen wider so that more or less the total microwave power still present at the end of the waveguide section can be coupled into the gas-discharge volume.

As an alternative or supplement to the provision of a slot, it is advantageous within the scope of a further embodiment of the inventive solution for the broken-open wall to have a series of openings lying in the microwave propagation direction. Overcoupling into the gas-discharge volume is also achievable in a particularly simple way with these openings.

In this connection, it is particularly expedient for the openings to increase in size in the microwave propagation direction so that in the event of a decrease in the microwave power in the waveguide section, there is simultaneously more intensive coupling of microwaves into the gas-discharge volume.

In order to separate the overcoupling structure from the laser gas in the gas-discharge volume in an inventive manner which is as simple as possible and, on the other hand, to also ensure effective coupling of microwaves into the gas-discharge volume, provision is advantageously made for the broken-open wall to be closed by a dielectric.

Owing to this dielectric, on the one hand, air at environmental pressure can be present in the overcoupling structure and, on the other hand, the respective, desired laser gas can be kept at the corresponding pressure in the gas-discharge volume.

In this case, it is particularly simple for the dielectric to carry the optical waveguide surface, i.e., for the dielectric to simultaneously act as wall of the optical waveguide.

The simplest and most advantageous solution within the scope of the inventive solution is for the dielectric to be of optically reflecting design so the dielectric both closes the broken-open wall and forms the wall of the optical waveguide and, in addition, itself represents the optical waveguide surface.

The design of the waveguide section itself has still to be described in detail. It is advantageous for the waveguide section to be closed off at its end.

In this connection, it is particularly expedient for the waveguide section to be closed off by a terminating short-circuit plate.

However, the short-circuit plate sometimes has the disadvantage of bringing about undesired reflections in the waveguide section. For this reason, it is particularly advantageous for the waveguide section to be closed off by a microwave swamp.

In particular, in order to meter the microwave propagation in the waveguide section and to thereby simultaneously control coupling of the microwave power into the gas-discharge volume in a more defined manner, it is particularly advantageous for the waveguide section to be provided with a series of tuner screws with which, in addition to the adaptation effected by the openings in the wall, complete adaptation of the waveguide section with respect to the coupling of the microwave power into the gas-discharge volume is possible.

In the simplest case, the waveguide section itself can be a waveguide section of straight orientation. It has, however, also proven expedient for the waveguide section to be a T-section, the transverse arm of which extends in the overcoupling direction. In this case, the coupled-in microwave power will already be uniformly divided into two opposite directions in the transverse arm and so this enables even better adjustment of the uniformity of the coupling of the microwave power from the transverse arm into the gas-discharge volume.

In a further modification of the inventive solution, the waveguide section tapers in the microwave propagation direction in order to meter the coupling of the microwave power into the gas-discharge volume.

In this connection, it is, for example, also conceivable, in the simplest case, for the slot to exhibit a constant width in the microwave propagation direction or for the series of openings to have a constant cross-section in the microwave propagation direction. It is, however, even better for the tapering of the waveguide section to be combined with an adaptation of the slot or the cross-section of the series of openings in the microwave propagation direction.

In a further variant of the inventive solution, provision is made for the waveguide section to be slotted and to engage over both optical waveguide surfaces including the strip region located between these.

It is particularly advantageous within the scope of the inventive solution for several overcoupling structures to be provided.

In this way, particularly with an optical waveguide of very wide and long design, a very uniform excitation of the laser gas in the gas-discharge volume can be achieved by variation of the arrangement of the overcoupling structures.

To this end, the simplest variant makes provision for the overcoupling structures to lie alongside one another.

In addition, it is expedient for the overcoupling structures to generate a gas-discharge in several strip regions extending substantially parallel to one another.

Optimum excitation of the laser gas in the gas-discharge volume is achieved when the strip regions fill out the gas-discharge volume substantially.

This is achieved in a particularly simple way by the microwave propagation direction in the overcoupling structures associated with adjacent strip regions extending in opposite directions so any difference in the width of the strip regions resulting from the increase in width of the slot or the increase in cross-section of the openings of a series of these can be compensated.

The great advantage of using several overcoupling structures becomes even clearer when each overcoupling structure is connected via the waveguide to a microwave source of its own. In such a case, several microwave sources can be used in a simple way to excite the laser gas in the gas-discharge volume without these microwave sources being connected by a waveguide and hence a large number of problems involved in the coupling of several microwave sources by a single waveguide is avoided. By using one microwave source associated with one overcoupling structure respectively all the problems are eliminated for, in particular, mutual interactions between the microwave sources and hence negative influencing of these owing to the strip regions lying alongside one another are avoided.

Within the scope of the inventive solution, it is particularly advantageous for the overcoupling structures to be arranged on both sides of the gas-discharge volume and to thereby make it possible for microwave power to be coupled into the gas-discharge volume from two opposite directions in order to excite the laser gas therein with the highest possible power.

In particular, it is expedient for microwave structures located opposite each other to be offset in relation to each other.

The orientation of the overcoupling direction relative to the optical waveguide and to the resonator has still to be described. The simplest solution is for the overcoupling direction to extend parallel to the resonator axis. This offers the advantage, in particular, in the case of a single overcoupling structure, that the optical waveguide and the resonator can be chosen relatively long and that their width corresponds to the width of the strip region of the chosen overcoupling structure so the laser gas is excited throughout the entire gas-discharge volume.

In addition, in the case of optical waveguides and resonators of broad design, with an overcoupling direction extending parallel to the resonator axis and preferably also parallel to the waveguide axis, several overcoupling structures extending in this direction can be arranged on an optical waveguide.

In particular, with optical waveguides of broad design, it is, however, also conceivable for the overcoupling direction to extend parallel to the transverse direction and for the arrangement of several overcoupling structures to, therefore, bring about excitation of the laser gas essentially throughout the entire length of the resonator and the optical waveguide. In particular, with instable resonators, it is necessary to have sufficient microwave power available in the region of the resonator axis so as to ensure that the laser will start to oscillate and so, in this case, an overcoupling direction extending parallel to the transverse direction has proven expedient as there are then no problems of exciting the gas-discharge volume throughout the entire width of the optically instable resonator, and a possibly incomplete exploitation of the length of this resonator creates fewer problems than incomplete excitation over the width thereof.

The resonator itself within the scope of the inventive solution has still to be described. It is particularly advantageous for the resonator to be designed so as to generate the beam path propagating in both the direction of the resonator axis and the transverse direction by multiple reflection on the mirrors with a component in the direction of the resonator axis and in the transverse direction.

In this case, it is particularly advantageous for the resonator to be an instable resonator.

Confocal resonators are preferably used and, in particular in conjunction with an optical waveguide, are preferably equipped with cylindrical mirrors.

An instable, optical resonator extending from the resonator axis, on which by way of definition the mirror surfaces stand perpendicular at the point of intersection with it, in one direction, as half of a symmetrical, confocal, optically instable resonator, with the laser beam, therefore, exiting from the resonator offset in the transverse direction on the side opposite the resonator axis, has proven particularly suitable.

Further features and advantages of the inventive solution are to be found in the following description and the appended drawings of several embodiments. The drawings show.

A first embodiment, designated in its entirety 10, of an inventive waveguide laser comprises a resonator, designated in its entirety 12, having a convex mirror 14 and a concave mirror 16. The resonator 12 is designed as optically instable resonator and in the illustrated embodiment a resonator axis 18 extends in FIG. 1 from a left edge of the convex mirror 14 to a left edge of the concave mirror 16.

Figure 1:
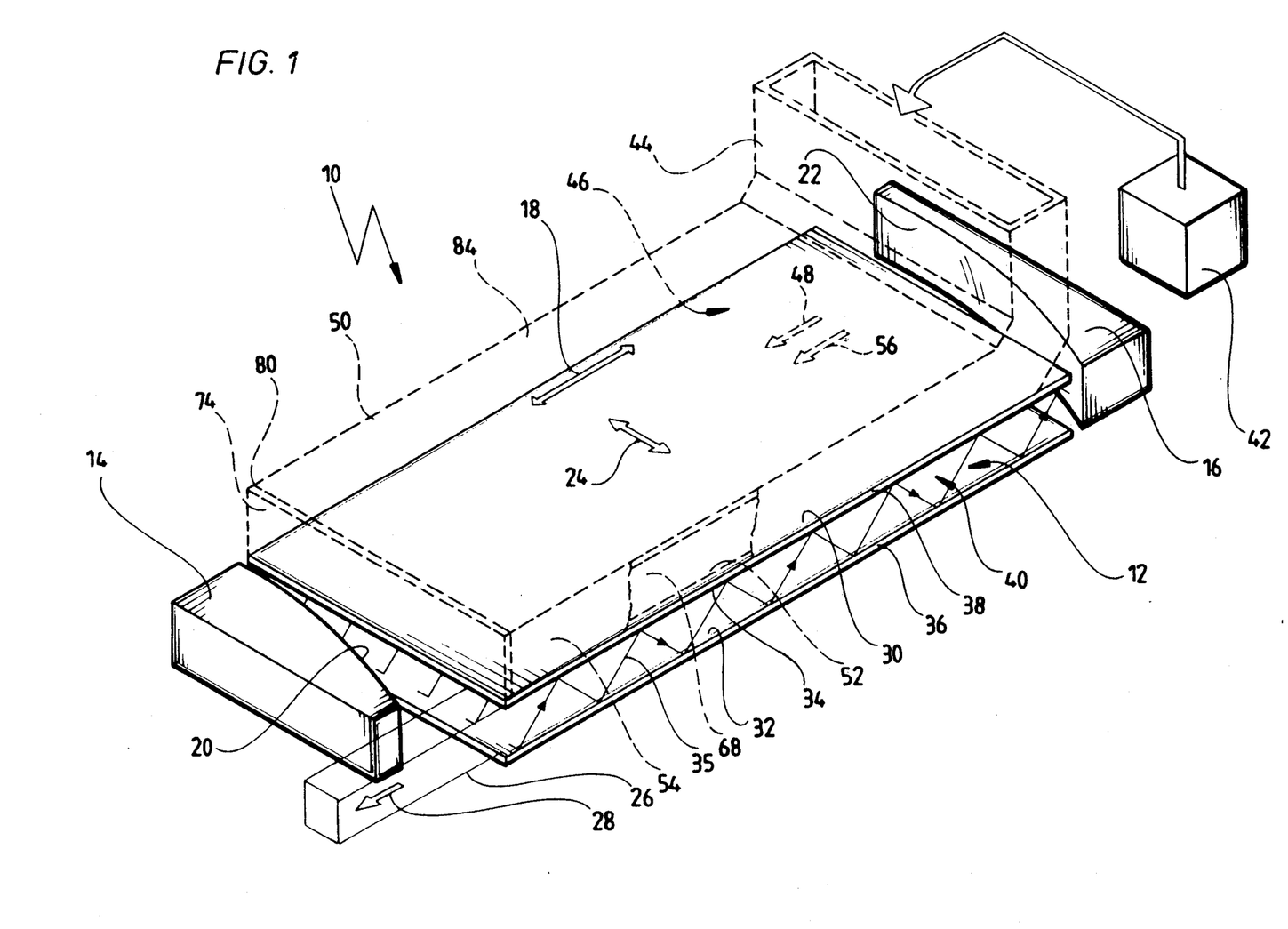
FIG. 1 a first embodiment of an inventive waveguide laser with an overcoupling structure indicated in dashed lines.

A mirror surface 20 of the convex mirror 14 stands at the point of intersection with the resonator axis 18 perpendicular on the latter and the same applies to a mirror surface 22 of the concave mirror 16.

Laser activity of the resonator 12, therefore, begins in the region of the resonator axis 18 and results in a beam path propagating in a transverse direction 24 owing to reflections on the mirror surfaces 20 and 22 and finally in an exiting laser beam 26 propagating in an exit direction 28 parallel to the resonator axis 18 and defined in its geometry, on the one hand, by the extent of the mirror surfaces 20 and 22 perpendicular to the transverse direction 24 and to the resonator axis 18 and, on the other hand, by the lesser extent of the convex mirror 14 compared with the concave mirror 16 in the transverse direction 24.

It is preferable for the mirrors 14 and 16 to be designated as cylindrical mirrors with a mirror surface oriented straight in the direction perpendicular to the transverse direction 24 and to the resonator axis 18 and, in addition, for them to be confocal with respect to one another.

An optical waveguide designated in its entirety 30 extends between the mirrors 14 and 16. The optical waveguide 30 comprises two optical waveguide surfaces 32 and 34 in parallel alignment with each other and extending in planes parallel to the transverse direction 24 and to the resonator axis 18, thereby enclosing the beam path of the resonator 12 between them. The optical waveguide surfaces 32 and 34 are of optically reflecting design and so rays 35 travelling back and forth between the mirrors 14 and 16 are reflected on these several times and thus guided by the optical waveguide surfaces 32 and 34.

The resonator 12 with the optical waveguide 30 is described in detail in European patent application No. 0 305 893, to which reference is made in full.

The optical waveguide surfaces 32 and 34 are each carried by a wall 36 and 38, respectively. In the present case, the wall 38 is made of a dielectric material and is of reflecting design for formation of the optical waveguide surface 34 for the laser rays 35. In the simplest case, the wall 36 is made of metal.

A gas-discharge volume 40 containing the respective laser gas is formed between the walls 36 and 38. In the illustrated embodiment, excitation of the laser gas in the gas-discharge volume is brought about by microwaves which are generated by a magnetron 42 serving as microwave source and are fed into a waveguide 44 which leads to an overcoupling structure 46 extending over the wall 38 on a side of the optical waveguide surface 34 opposite the gas-discharge volume 40. The overcoupling structure 46 extends with its overcoupling direction 48 parallel to the resonator axis 18 and covers in this direction essentially the full extent of the wall 38 in this direction.

In the simplest case, the overcoupling structure 46 indicated in dashed lines in FIG. 1 comprises a waveguide section 50 resting with a wall 52 directly on the wall 38. The wall 52 is preferably the wall of a broad side of the waveguide section 50 but it is, in like manner, possible to place the waveguide section 50 on the wall 38 with a wall 54 of a narrow side instead of with the wall 52 of a broad side.

Figures 2, 3:
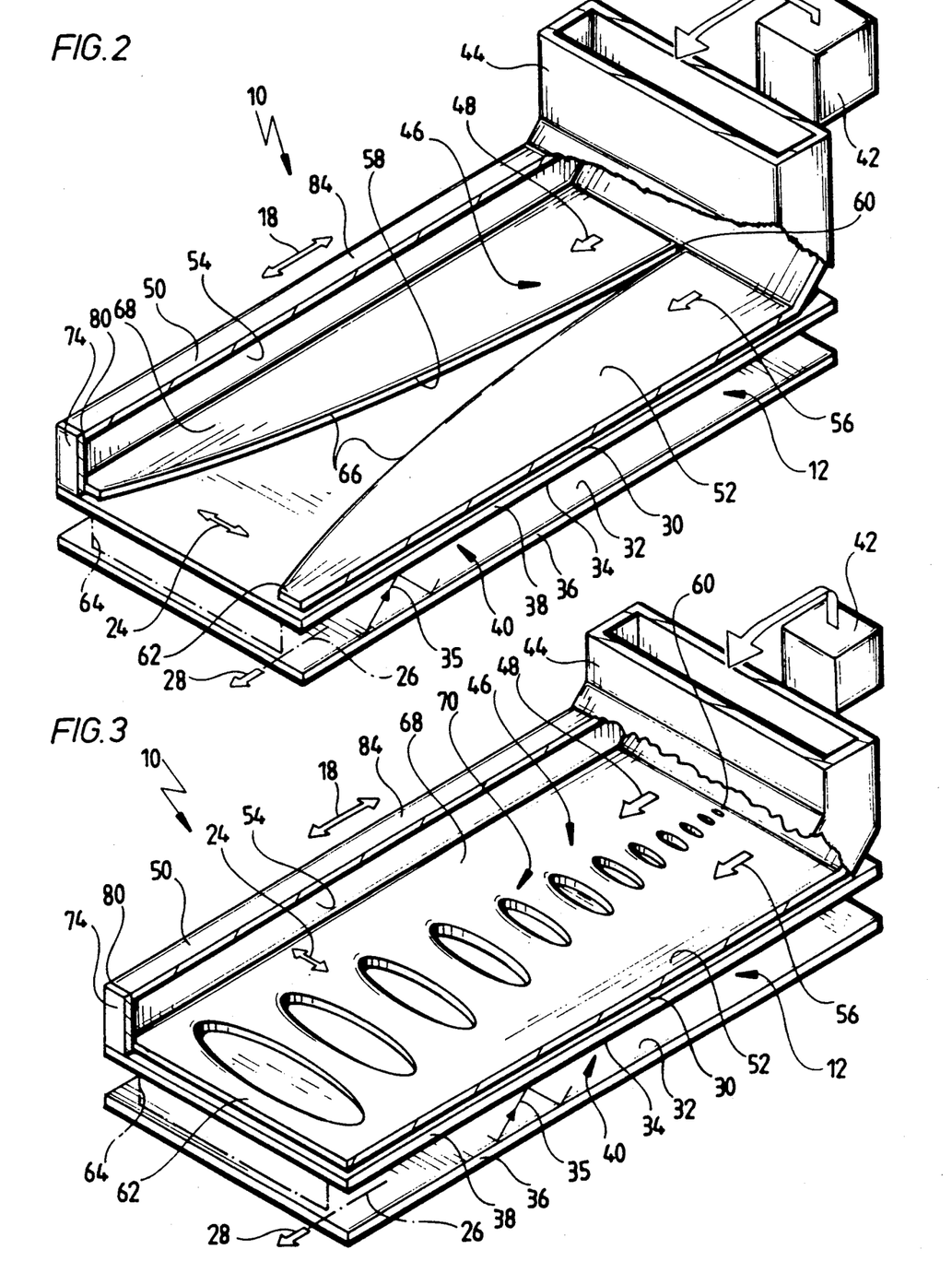
FIG. 2 the first embodiment with the overcoupling structure cut open and without resonator mirrors.
FIG. 3 an illustration, similar to FIG. 2, of a variant of the first embodiment.

From this waveguide section 50, the microwaves propagating therein in a propagation direction 56 which, in this case, coincides with the overcoupling direction 48, are to be coupled into the gas-discharge volume 40. For this purpose, the wall 52 of the waveguide section 50 consisting totally of metal is provided, as illustrated in FIG. 2, with a slot 58 which widens in the propagation direction 56 of the microwaves from an initial region 60 of the overcoupling structure 46 to an end region 62 increasingly in the transverse direction 24. This slot 58 enables passage of the microwaves from the waveguide section 50 through the wall 38 made of a dielectric material into the gas-discharge volume 40, which results in microwave excitation of the laser gas in a strip region 64 of the gas-discharge volume 40. The slot 58 increases in width in order to achieve substantially constant coupling-in of the microwave power in the strip region 64 as the microwaves first arriving in the initial region 60 of the overcoupling structure 46 are available with high power and the total microwave power should be prevented from already being coupled into the gas-discharge volume 40 in the initial region 60. For this reason, the narrow slot allows only a minimal coupling-out of the power in the initial region 60, but this increases progressively in the propagation direction 56 of the microwaves and so the power of the microwaves decreases constantly in its propagation direction 56 as far as the end region 62 in which the total microwave power still present in the waveguide section 50 is then coupled into the strip region 64.

The slot 58 may comprise edges 66 extending in linear configuration in the overcoupling direction 48. It is, however, also possible for the edges 66 to be of non-linear configuration, as illustrated in FIG. 2, and for their spacing from each other to be such that the microwaves are uniformly coupled into the strip region 64.

An interior 68 of the waveguide section 50 is completely separate from the laser gas in the gas-discharge volume 40 and so air under normal pressure can be present in the waveguide and the necessary gas discharge only takes place in the desired strip region.

A variant of the first embodiment, illustrated in FIG. 3, shows instead of the slot 56 a series 70 of individual openings which likewise exhibit a small cross-sectional area starting in the initial region 60 and a progressively increasing cross-sectional area in the overcoupling direction 48 or in the direction of propagation 56 of the microwaves in order to achieve the same effect as in the embodiment illustrated in FIG. 2, i.e., only limited coupling-in of microwaves in the initial region 60 and complete coupling-in of the microwaves reaching the end region 62.

Otherwise, the variant illustrated in FIG. 3 is of the same design as the first embodiment and so the same parts bear the same reference numerals and reference is, therefore, to be had to the statements on the first embodiment for a description of these.

The waveguide section 50 is closed off in the end region 62 of the overcoupling structure 46, as indicated in dashed lines in FIG. 1, by a short-circuit plate 74, i.e., by a metal wall extending transversely to the propagation direction 56.

Figures 4, 5:
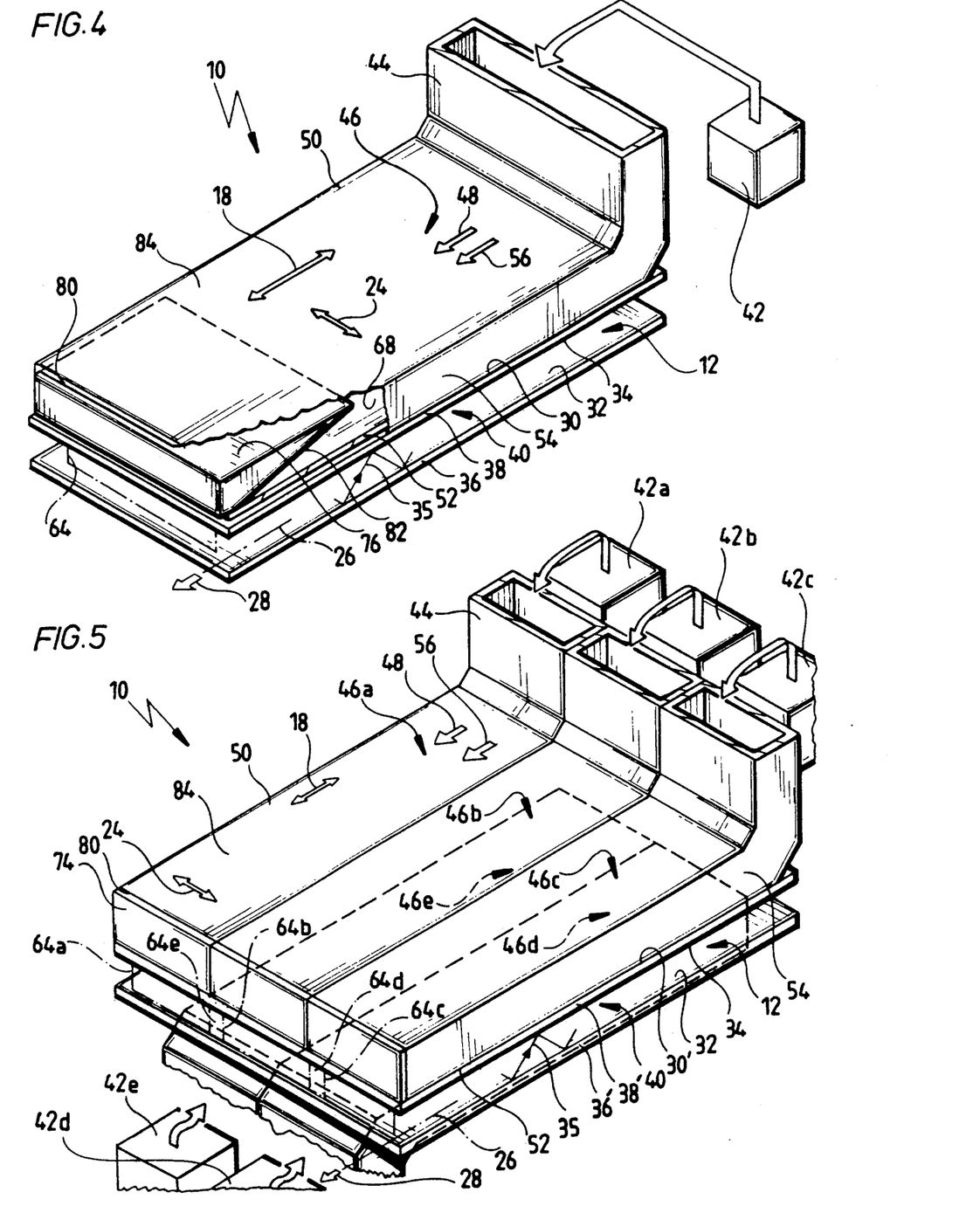
FIG. 4 an illustration, similar to FIG. 1, but without resonator mirrors, of a further variant of the first embodiment.
FIG. 5 a schematic illustration of a second embodiment with resonator mirrors omitted.

As an alternative to the short-circuit plate 74, there can be inserted in the waveguide section 50 in the end region 62 thereof, as illustrated in a further variant of the first embodiment in FIG. 4, a wedge 76 made of a dissipative, dielectric material which closes the waveguide section 50 off completely at one end 80, extends in the transverse direction 24 over the entire width of the waveguide section 50 and tapers with an inclined surface 82 with increasing spacing from the wall 36 to the opposite wall 84.

This wedge 76 acts as a dissipative dielectric and serves to eliminate the reflections normally occurring at the short-circuit plate 74 in the direction opposite to the propagation direction 56 of the microwaves.

In a second embodiment of an inventive waveguide laser, illustrated in FIG. 5, insofar as the same parts are used as in the first embodiment, these bear the same reference numerals and so reference is to be had to the statements on the first embodiment for a description of these.

In the second embodiment, the optical waveguide 30' is of broader design than in the first embodiment and so the overcoupling structure 46 with the waveguide section 50, the dimensions of which are determined by the frequency of the magnetron 42, is inadequate for complete excitation of the gas-discharge volume 40. For this reason, there are arranged on the wall 38' of the optical waveguide 30' several overcoupling structures 46a, 46b and 46c and on the opposite wall 36' the overcoupling structures 46d and 46e which are all designed in accordance with the first embodiment and the alternatives explained in connection with the first embodiment.

Each of these overcoupling structures 46a to 46e brings about excitation of the laser gas in the gas-discharge volume 40 in a strip region 64a to 64e associated with the respective overcoupling structure 46a to 46e. In this second embodiment, the overcoupling structures 46a to 46e are placed so close to one another that the strip regions 64a to 64e are immediately adjacent to one another and the laser gas is, therefore, excited throughout the entire gas-discharge volume 40'.

It is preferable for each of the overcoupling structures to be supplied by its own magnetron 42a to 42e. These can all operate independently of one another. Consequently, in addition to both a constant excitation of the laser gas in the direction of the resonator axis, i.e., in the overcoupling direction 48 and a substantially constant excitation of the laser gas in the transverse direction 24 throughout the entire gas-discharge volume 40, several magnetrons 42a to 42e which are commercially obtainable with limited power are available with the sum of their power for operating the inventive waveguide laser without the problems normally involved in the coupling of several magnetrons 42 since mutual influencing of the magnetrons 42a to 42e is simultaneously prevented owing to the overcoupling of the microwave power into the strip regions 64a to 64e associated with the individual overcoupling structures 46a to 46e.

Figures 6, 7:
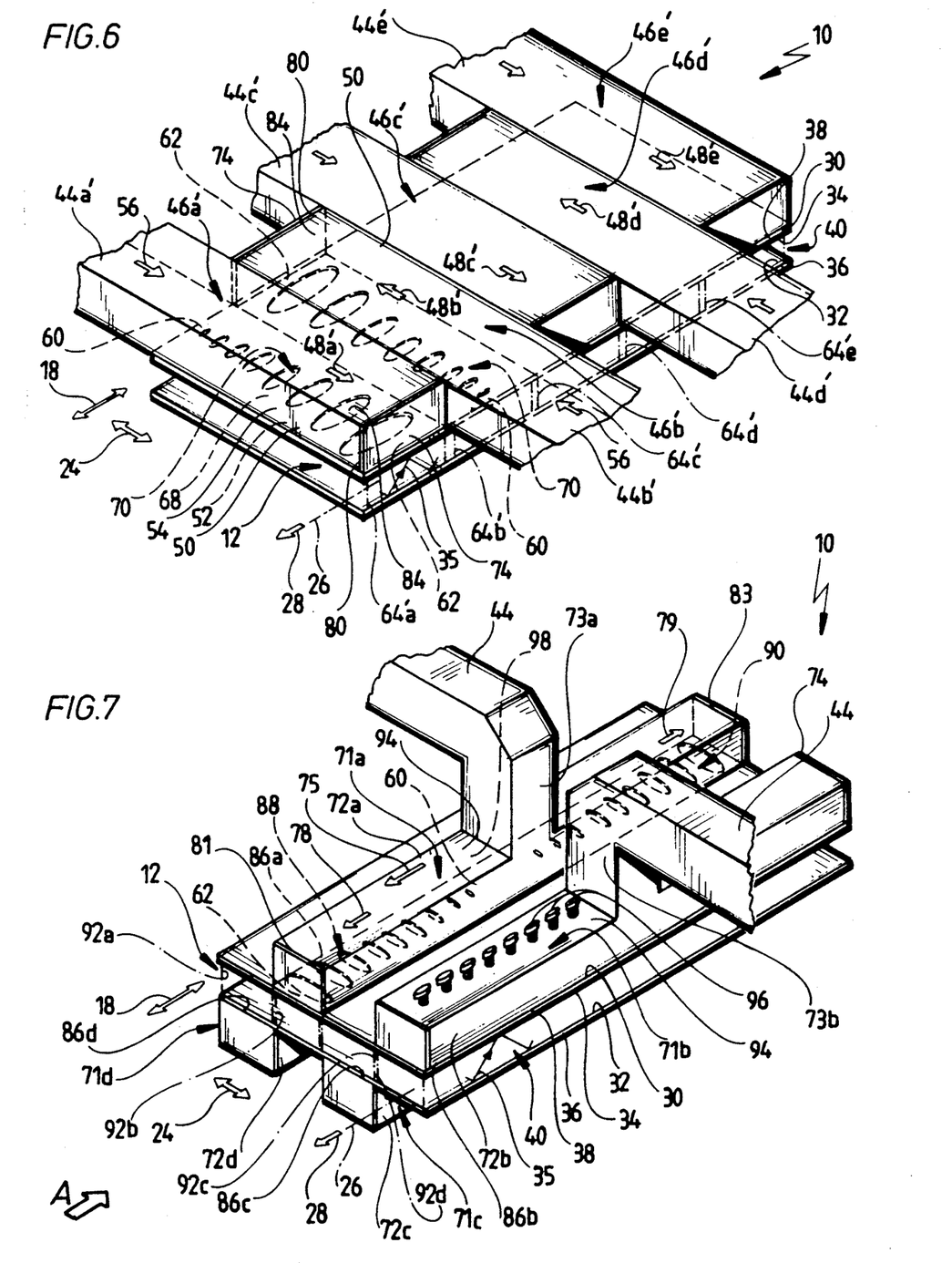
FIG. 6 a schematic illustration of a third embodiment with resonator mirrors omitted.
FIG. 7 a schematic illustration of a fourth embodiment with resonator mirrors omitted.

In a third embodiment of an inventive laser, illustrated in FIG. 6, insofar as the parts are identical with those of the first embodiment, these bear the same reference numerals and so reference is to be had to the statements on the first embodiment for a description of these.

As in the first embodiment, the overcoupling structures 46 rest on the wall 38, but several overcoupling structures 46a', 46b', 46c', 46d' and 46e' are provided and these cover the entire wall 38.

In contrast with the first embodiment, the overcoupling directions 48a' to 48e' in this embodiment do not extend parallel to the resonator axis 18 but rather parallel to the transverse direction 24, i.e., perpendicularly to the resonator axis 18. The overcoupling structures 46a' to 46e' are straight-line continuations of waveguides 44a' to 44e' leading to these and having, similar to the variant in FIG. 3, series 70 of wall openings, the cross-sectional area of which increases in the propagation direction 56 of the microwaves.

In addition, the waveguides 44a' to 44e' leading to the overcoupling structures 46a' to 46e' are led in alternately from opposite sides of the wall 38 so that the propagation directions 56 of the microwaves in the overcoupling structures 46a' to 46e' successively exhibit the respective opposite direction. The regions 64a' to 64e' thereby excited in the gas-discharge volume 40 similarly lie close together so that a substantially constant excitation of the laser gas takes place in the gas-discharge volume 40 in both the overcoupling direction 48a' to 48e' and the transverse direction thereto, i.e., in the direction of the resonator axis 18.

In a fourth embodiment, illustrated in FIG. 7, the optical waveguide 30 is of exactly the same design as in the first embodiment and a corresponding resonator 12 is also provided, but not illustrated in the drawing, and so reference is to be had in this connection to the statements on the first embodiment.

In contrast with the first embodiment, overcoupling structures 71a, 71b, 71c and 71d are each connected to a waveguide 44 coming from a magnetron 42 and have the shape of a T-junction. A transverse arm 72a to 72d of this T-junction is likewise in the form of a waveguide section and connected at the center to a center arm 73a, 73b which, in turn, is connected to the respective waveguide 44a, b.

The transverse arms 72a to 72d extend along an overcoupling direction 75 which runs parallel to the resonator axis 18 on the wall 38 and the wall 36 of the waveguide laser 30. However, there are two respective microwave propagation directions 78 and 79 which start from the center arm 73 and extend towards terminations 81 and 83 of the transverse arm 72. The terminations 81 and 83 may be either short-circuit plates, as illustrated in FIG. 1, or a wedge acting as microwave swamp, as illustrated in FIG. 4.

In accordance with the two opposite microwave propagation directions 78 and 79, series 88 and 90 of openings are provided in a wall 86a to 86d of the respective transverse arm 72a to 72d resting on the wall 38. These openings have increasing cross-sections in the microwave propagation direction 78 and 79, respectively, in order to achieve a substantially uniform coupling-in of the microwave power in the respective overcoupling direction 75 in the strip regions 92a to 92d associated with the respective overcoupling structures 71a to 71d, as explained hereinabove in connection with FIG. 3.

Figure 8:
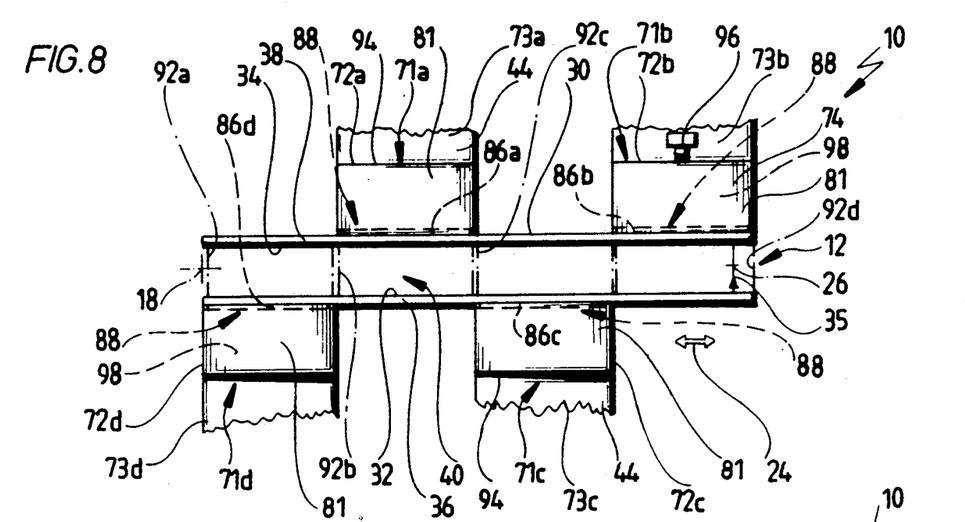
FIG. 8 a plan view in the direction of arrow A in FIG. 7.

As illustrated, in particular, in FIG. 8, the transverse arms 72a and 72b on the wall 38 and the transverse arms 72d and 72e on the wall 36 are arranged in offset relation to one another so that the excited strip regions 92a to 92d in the gas-discharge volume 40 lie close together and hence uniform excitation of the laser gas in the gas-discharge volume 40 is achieved in both the direction of the resonator axis 18 and the transverse direction 24.

For further improvement of the adaptation of the coupling of the microwave power into the gas-discharge volume in the overcoupling direction 86 and, in particular, subsequent variation thereof, series of tuner screws 96 are arranged along the microwave propagation directions 78 and 79 at the center of the transverse arms 72a to 72d in a wall 94 opposite the wall 86. These tuner screws are preferably made of a dielectric material and depending on how far they extend into an interior 98 of the respective transverse arm 72, offer the possibility of further adaptation of the overcoupling.

Figure 9:
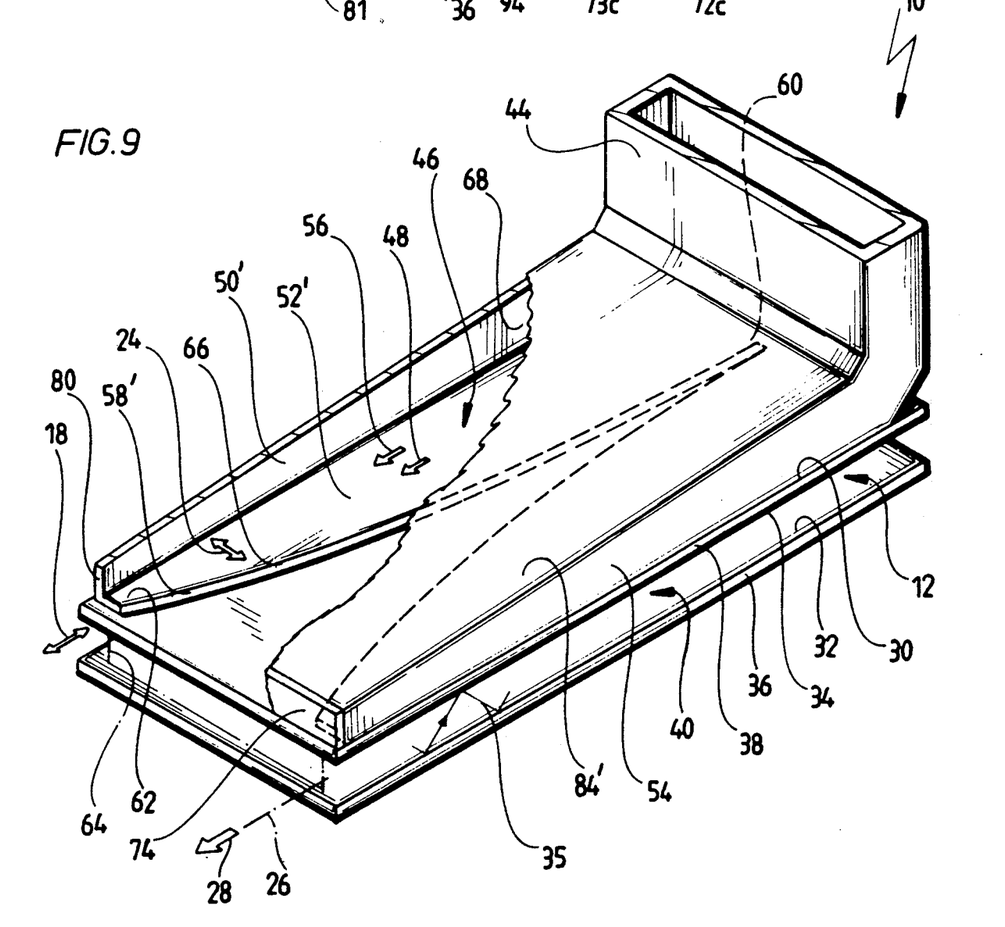
FIG. 9 a schematic illustration similar to FIG. 4 of a fifth embodiment.

In a fifth embodiment, illustrated in FIG. 9, insofar as the parts are identical with those of the first embodiment, these bear the same reference numerals and so reference is to be had to the statements on the first embodiment for a description of these.

The overcoupling structure 46 likewise comprises a waveguide section 50' which extends with its overcoupling direction 48 parallel to the resonator axis 18, but with its wall 84' opposite the wall 52' extends from the initial region 60 as far as the end region 62 towards the wall 52' and hence by tapering in the microwave propagation direction 56 contributes to a constantly increasing overcoupling of the microwaves into the strip region 64 below it. The slot 58 which in the first embodiment exhibits an increasing width in the microwave propagation direction 56 can, in the simplest case, therefore, exhibit a constant width in the fifth embodiment as the increasing coupling-in of microwaves is brought about by the tapering of the waveguide section 50'. It is, however, entirely within the scope of the inventive solution to design the slot 58' in exactly the same way as the slot 58 of the first embodiment and to achieve a constant coupling-in of the microwave power in the strip region 64 by the combination of the tapering waveguide section 50' with a slot 58' widening in the microwave propagation direction 56.

Figure 10:
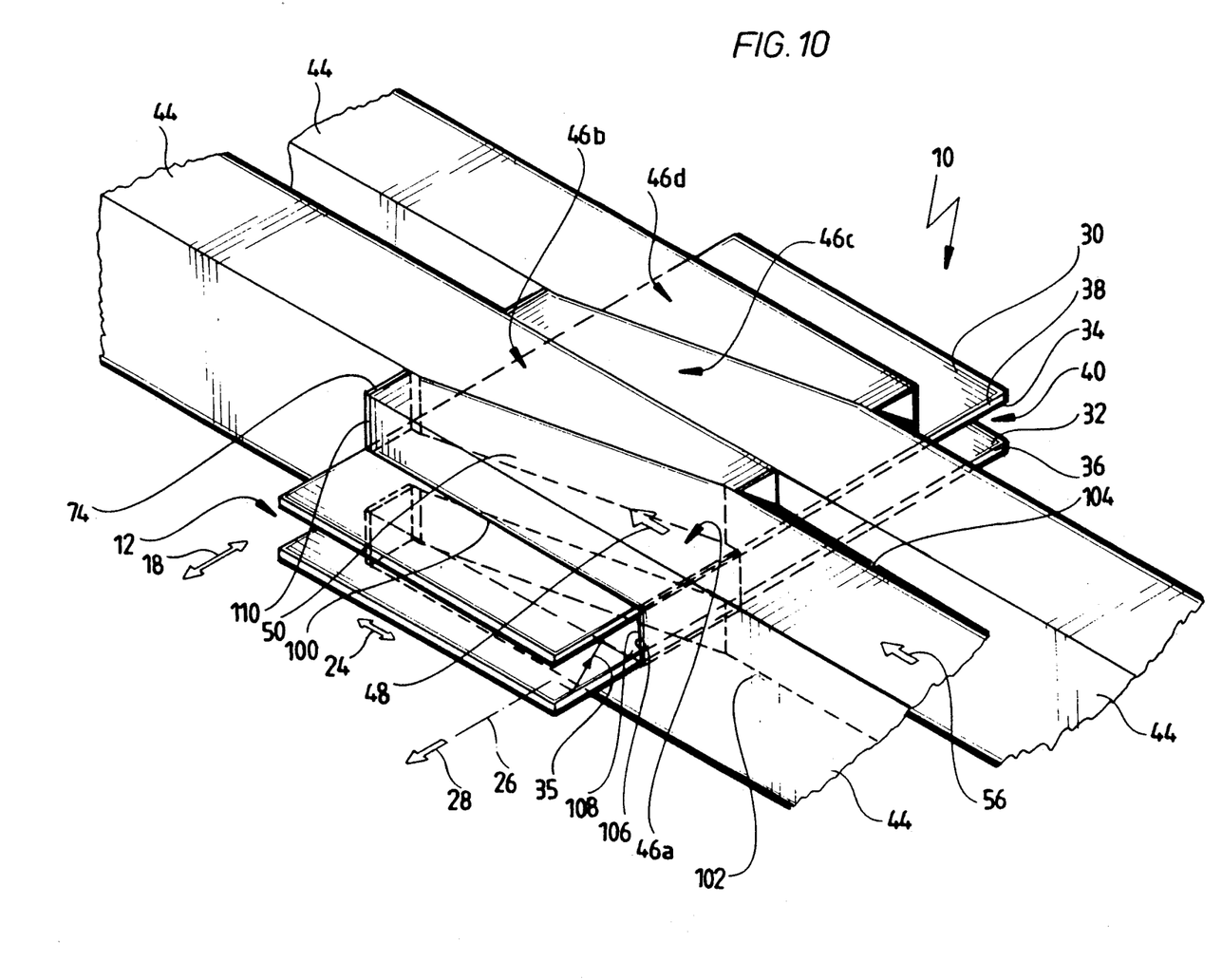
FIG. 10 a schematic illustration, similar to FIG. 9, of a sixth embodiment.

In a sixth embodiment of the inventive waveguide laser, illustrated in FIG. 10, insofar as the parts, in particular the optical waveguide 30, are identical with those of the first embodiment, these bear the same reference numerals and so reference is to be had to the statements on the first embodiment for a description of these.

In contrast with the first embodiment, the overcoupling structures 46a, 46b, 46c, 46d are each designed as waveguide sections with a central longitudinal slot 100 through which the optical waveguide 30 extends. It is preferable for opposite walls 102 and 104 of a broad side of the waveguide section to be provided with this slot 100. In addition, the two walls 102 and 104 taper towards one another in the microwave propagation direction 56 to provide coupling-in of the microwaves which is as uniform as possible in the strip region 64 corresponding to the section of the gas-discharge volume 40 located in the longitudinal slot 100 in the overcoupling direction 48 which now extends parallel to the transverse direction 24 and perpendicular to the resonator axis 18.

In the sixth embodiment, the resonator axis preferably stands perpendicular on one of the walls 102 or 104.

The longitudinal slot 100 in the sixth embodiment is delimited by the walls 36 and 38 of the waveguide and by an additional wall 106 extending between the walls 36 and 38 along a transverse side 108 of the longitudinal slot 100 and hence separates the overcoupling structure 46 fully and in a gas-tight manner from the gas-discharge volume 40.

The overcoupling structures 46 are likewise closed at their end 110 by either a short-circuit plate or a microwave swamp.

The present disclosure relates to the subject matter disclosed in German application No. P 39 37 491.2 of Nov. 10, 1989, the entire specification of which is incorporated herein by reference.

What is claimed is:

1. A waveguide laser comprising a resonator having mirrors arranged in spaced, opposite relation to each other in the direction of a resonator axis and a beam path extending in both the direction of said resonator axis and a transverse direction perpendicular thereto, an optical waveguide extending with a waveguide longitudinal direction essentially in the direction of said resonator axis between said mirrors and having optical waveguide surfaces extending in facing, parallel relation to each other in a plane parallel to the direction of said resonator axis and to said transverse direction and guiding said beam path by reflections, and a gas-discharge volume located between said optical waveguide surfaces and containing a laser gas, characterized in that a microwave source (42) is provided, in that microwaves are introducible into a waveguide (44) leading to said optical waveguide (30) from said microwave source (42), and in that an overcoupling structure (46) separate from said laser gas in said gas-discharge volume (40) is arranged on a side of one of said optical waveguide surfaces (32, 34) opposite said gas-discharge volume (40), said overcoupling structure being connected to said waveguide (44), extending in an overcoupling direction (48) parallel to said optical waveguide surface (34) and bringing about in a strip region (64) in said gas-discharge volume (40) along said overcoupling direction (48) a substantially constant coupling-in of the microwave power.

2. A waveguide laser as defined in claim 1, characterized in that said overcoupling structure (46) extends over a multiple of half a wavelength of said microwaves in said overcoupling direction (48).

3. A waveguide laser as defined in claim 1, characterized in that said overcoupling structure (46) comprises a waveguide section (50) extending in said overcoupling direction (48) with a wall (52) broken open towards said optical waveguide surface (32, 34).

4. A waveguide laser as defined in claim 3, characterized in that said broken-open wall (52) has a slot (58) extending in said overcoupling direction (48).

5. A waveguide laser as defined in claim 4, characterized in that said slot (58) increases in width in said microwave propagation direction (56).

6. A waveguide laser as defined in claim 3, characterized in that said broken-open wall (52) has a series (70) of openings lying in said microwave propagation direction (56).

7. A waveguide laser as defined in claim 6, characterized in that said openings (70) increase in size in said microwave propagation direction (56).

8. A waveguide laser as defined in claim 3, characterized in that said waveguide section (50) is closed off at its end.

9. A waveguide laser as defined in claim 8, characterized in that said waveguide section (50) is closed off by a terminating short-circuit plate (74).

10. A waveguide laser as defined in claim 8, characterized in that said waveguide section (50) is closed off by a microwave swamp (76).

11. A waveguide laser as defined in claim 3, characterized in that said waveguide section (50) is provided with tuner screws (96).

12. A waveguide laser as defined in claim 3, characterized in that said waveguide section is a T-section (72, 73), the transverse arm (72) of which extends in said overcoupling direction (48).

13. A waveguide laser as defined in claim 3, characterized in that said waveguide section (50) tapers in said microwave propagation direction (56).

14. A waveguide laser as defined in claim 3, characterized in that said waveguide section is slotted and engages over both optical waveguide surfaces (32, 34) including said strip region (64) located between these.

15. A waveguide laser as defined in claim 1, characterized in that said broken-open wall (52) is closed off by a dielectric (36, 38).

16. A waveguide laser as defined in claim 15, characterized in that said dielectric (36, 38) carries said optical waveguide surface (32, 34).

17. A waveguide laser as defined in claim 16, characterized in that said dielectric (36, 38) is of optically reflecting design.

18. A waveguide laser as defined in claim 1, characterized in that several overcoupling structures (46) are provided.

19. A waveguide laser as defined in claim 18, characterized in that said overcoupling structures (46) lie alongside one another.

20. A waveguide laser as defined in claim 18, characterized in that said overcoupling structures (46) generate a gas discharge in several strip regions (64) extending substantially parallel to one another.

21. A waveguide laser as defined in claim 20, characterized in that said strip regions (64) substantially fill out said gas-discharge volume (40).

22. A waveguide laser as defined in claim 18, characterized in that said microwave propagation directions (56) in said overcoupling structures (46) associated with successive strip regions (64) extend in opposite directions.

23. A waveguide laser as defined in claim 18, characterized in that each overcoupling structure (46) is connected via said waveguide (44) to a microwave source (42) of its own.

24. A waveguide laser as defined in claim 18, characterized in that said overcoupling structures (46) are arranged on both sides of said gas-discharge volume (40).

25. A waveguide laser as defined in claim 24, characterized in that overcoupling structures (46) located opposite each other are staggered in relation to each other.

26. A waveguide laser as defined in claim 1, characterized in that said overcoupling direction (48) extends parallel to said resonator axis (18).

27. A waveguide laser as defined in claim 1, characterized in that said overcoupling direction (48) extends parallel to said transverse direction (24).

* * * * *